(12) United States Patent
Yamazaki et al.

(10) Patent No.: US 7,829,141 B2
(45) Date of Patent: Nov. 9, 2010

(54) METHOD AND APPARATUS FOR DEPOSITING PARTICLES

(75) Inventors: Mutsuki Yamazaki, Kanagawa (JP);
Kohei Nakayama, Kanagawa (JP);
Yoshihiko Nakano, Kanagawa (JP); Wu Mei, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 12/200,532

(22) Filed: Aug. 28, 2008

(65) Prior Publication Data

US 2009/0069173 A1 Mar. 12, 2009

(30) Foreign Application Priority Data

Aug. 31, 2007 (JP) .............................. 2007-226066

(51) Int. Cl.
*B05D 7/00* (2006.01)
(52) U.S. Cl. .................. 427/214; 427/216; 502/185; 502/300; 420/465
(58) Field of Classification Search .............. 427/372.2, 427/344, 255.5, 213, 214, 216, 217; 502/174, 502/185, 300; 204/192.12–193
See application file for complete search history.

(56) References Cited

U.S. PATENT DOCUMENTS

| | | | | |
|---|---|---|---|---|
| 4,139,768 | A * | 2/1979 | Van Landeghem et al. | 378/30 |
| 5,922,487 | A * | 7/1999 | Watanabe et al. | 429/44 |
| 6,379,834 | B1 * | 4/2002 | Giallombardo et al. | 429/44 |
| 7,294,603 | B2 | 11/2007 | Katori et al. | |
| 2004/0259730 | A1 | 12/2004 | Katori et al. | |
| 2005/0106449 | A1 * | 5/2005 | Fan et al. | 429/44 |

(Continued)

FOREIGN PATENT DOCUMENTS

JP 2003-033668 2/2003

(Continued)

OTHER PUBLICATIONS

Forschner, et al. "Design of Horizontal Vessels operated as CSTR—Basic Mixing Tasks, RTD, Productivity", Chem. Eng. Techno. 2004, 27, No. 3. 282-286.*

(Continued)

*Primary Examiner*—Stuart Hendrickson
*Assistant Examiner*—Richard M Rump
(74) *Attorney, Agent, or Firm*—Finnegan, Henderson, Farabow, Garrett & Dunner, L.L.P.

(57) ABSTRACT

A supporting method for supporting a metal particle including at least two elements on a surface of a plurality of granular supports in a decompression device, the supporting method supporting the metal particle whose particle diameter being smaller than a grain size of the granular support comprises holding the plurality of granular supports in a container and rotating a stirring device and/or the container, a stirring period in which the relative position among the plurality of granular supports are changed and a non-stirring period in which the relative position among the plurality of granular supports are not changed being altered by the rotating, wherein the decompression device comprises, an evaporation source for evaporating elements to form an alloy particle, the container for holding the plurality of granular supports in the decompression device so that a relative position among granular supports is able to be changed, a rotating device for rotating the container and the stirring device disposed in the container.

4 Claims, 4 Drawing Sheets

U.S. PATENT DOCUMENTS

| | | |
|---|---|---|
| 2007/0167314 A1 | 7/2007 | Katori et al. |
| 2007/0213212 A1 | 9/2007 | Abe et al. |
| 2008/0230171 A1 | 9/2008 | Mei et al. |
| 2009/0018366 A1* | 1/2009 | Berweiler et al. ........... 564/420 |

FOREIGN PATENT DOCUMENTS

| | | |
|---|---|---|
| JP | 2005-264297 | 9/2005 |
| WO | WO/2006/018257 * | 6/2006 |

OTHER PUBLICATIONS

"Industrial Carbon: Its Elemental, Adsorptive and Manufactured Forms". C. L. Mantell 1947. p. 60.*

* cited by examiner

METHOD AND APPARATUS FOR DEPOSITING PARTICLES

CROSS-REFERENCE TO RELATED APPLICATION

This application is based upon and claims the benefit of priority from the prior Japanese Patent Application No. 2007-226066, filed on Aug. 31, 2007, the entire contents of which are incorporated herein by reference.

BACKGROUND OF THE INVENTION

1. Field of the Invention

This invention relates to a method and apparatus for supporting particles onto a granular support, particularly, a grain size of a granular support is equal to or less than 1 μm and a particle size of a supported particle is equal to or less than 10 nm.

2. Description of Related Art

Noble metals such as Pt are used not only as an accessory but also as a chemical catalyst. For example, an exhaust emission control system and a solid high polymer fuel cell use Pt as a catalyst. In order to apply a fuel cell to a mobile device and so on as a power source, a fuel cell which uses methanol solution as a fuel is studied actively because it can operate in low temperature and is small and lightweight. However, for a fuel cell to be widely used, further improvement of a fuel cell in performance is desired. A fuel cell converts chemical energy which is generated by an electrocatalytic reaction to electric power, it needs high-activity catalyst to achieve a high efficiency.

PtRu is widely used as a catalyst of an anode of a fuel cell. Though theoretical output voltage of an electrocatalytic reaction is 1.21 V, a voltage loss occurs at a PtRu catalyst. A voltage loss of a PtRu catalyst is about 0.3 V. A high-activity (methanol oxidization activity) which is higher than that of PtRu as an anode catalyst is desired in order to decrease the voltage loss at an anode catalyst.

In order to improve a methanol oxidization activity, addition of elements except for Pt and Ru to a PtRu catalyst is studied. In a method to produce a catalyst using a solution such as dipping method, metal elements (elements used as a catalyst) to be supported is oxidized and deposited onto a surface of a carbon granular support. The deposited metal elements are reduced and a metal catalyst is obtained. Therefore, a heat treatment has to be performed in a reduction gas atmosphere, and a temperature of the heat treatment is different based on an element.

In case that Pt and Ru are used, Pt and Ru are reduced at almost the same temperature, and Pt and Ru are easily alloyed. However, if other elements that improve a catalyst activity are added, a reduction temperature may be extremely high, and a reaction between a carbon which is a support base and elements which are included as a catalyst may occur.

A production of a catalyst using a sputtering method or an evaporation method is studied. According to these methods, objective elements are directly deposited onto a carbon support base. Therefore, deposited elements do not have to be reduced, and PtRu alloy is formed even in a room temperature.

In a conventional sputtering method or an evaporation method, carbon which is formed like a sheet (hereinafter it is called a carbon paper) is generally used. In this case, catalyst particles are deposited on a surface of a carbon paper. In such a case, catalyst particles are deposited only on a surface of a carbon paper. Therefore, when a few nm of catalyst particles are deposited, an amount of catalyst which is supported by a carbon paper is not enough to obtain necessary electric power to be generated. Further, catalyst particles may not be formed and a thin film of a catalyst may be formed due to a situation of a deposition. If a thin film of a catalyst is formed, a surface area of a catalyst becomes narrow and electric-generation capacity is decreased.

On the other hand, it is known that catalyst metal materials can be deposited on a granular support (Please refer to Japanese Unexamined Patent Publication Number 2005-264297).

In the above described document, catalyst elements are deposited on carbon granular supports while the carbon granular supports are stirred. In case that the catalyst elements are deposited on carbon granular supports while the carbon granular supports are stirred, it is difficult to detect material other than carbon even if the products are observed by an electronic microscope. The difficulty of detection is mainly caused by two reasons. One reason depends on a forming process for evaporated atoms to form metal particles, and another reason depends on a surface condition of carbon granular supports on which catalyst particles are deposited. In case that metal atoms (catalyst atoms) are physically deposited using an evaporation method in vacuum condition, objective elements are evaporated and atoms of objective elements are deposited onto granular supports (For example, carbon) by using a thermal and kinetic energy. Evaporated metal atoms migrate at a portion where energetically stable level, and deposited metal atoms form seeds of alloy. Particles of a catalyst alloy are grown using the seeds above described, and grown-up particles are united with each other and form a polycrystalline film.

In case that the diameter of a carbon granular support is equal to or less than 1 μm, the surface of the carbon granular support has a lot of defects. Therefore, in a carbon granular support which has a diameter less than 1 μm, an area of the surface on which the evaporated atoms can be migrated becomes narrow and seeds to become catalyst particle are hardly formed. If catalyst atoms are deposited onto carbon granular supports while the carbon granular supports are stirred, carbon granular supports are removed before the seeds of catalyst particles are formed. Therefore, the seeds and particles of the catalyst are not formed because only catalyst atoms are attached onto carbon granular supports. In order to achieve a function as a catalyst, it is preferable that a diameter of a catalyst particle to have a diameter between 2 nm to 10 nm. Therefore, an atomic catalyst itself is not able to be used as a catalyst.

Further, when a thin film of a catalyst alloy is formed on carbon supports using a sputtering method, an alloy target corresponding to an objective alloy is generally used. However, a target made of noble metals has disadvantages in material costs and processing costs. Further, a target that is used in a sputtering method has a region called an erosion region. The erosion region is a region which has a higher etching rate than other region of a target. A hole that penetrates the target may be formed if the erosion region is sputtered. The target having a hole is not able to be used as a target. Therefore, a target corresponding to the composition of the catalyst alloy is only used 10% to 20% of a whole target amount. The target which can not use as a sputtering target is recycled by melting the remaining material. However, in order to recycle a remaining target, additional costs are needed. For example, processing costs, analyzing costs of a remaining target, and so on. Further, if an element which hardly melt is included in a catalyst alloy, sputtering rate of the element may vary while a sputtering is performed, and a composition of the deposited alloy may be varied.

According to the present invention, a granular support which supports alloy particles can be obtained. Particularly, a diameter of the alloy particles is equal to or wider than 2 µm and equal to or narrower than 10 µm, and a cost for producing granular supports is decreased and a fluctuation of a composition of a catalyst alloy is decreased.

SUMMARY OF THE INVENTION

A supporting method for supporting a metal particle including at least two elements on a surface of a plurality of granular supports in a decompression device, the supporting method supporting the metal particle whose particle diameter being smaller than a grain size of the granular support comprises holding the plurality of granular supports in a container and rotating a stirring device and/or the container, a stirring period in which the relative position among the plurality of granular supports are changed and a non-stirring period in which the relative position among the plurality of granular supports are not changed being altered by the rotating, wherein the decompression device comprises, an evaporation source for evaporating elements to form an alloy particle, the container for holding the plurality of granular supports in the decompression device so that a relative position among granular supports is able to be changed, a rotating device for rotating the container and the stirring device disposed in the container.

DESCRIPTION OF THE PREFERRED EMBODIMENTS

Embodiment 1

Supporting Method

Figure 1:
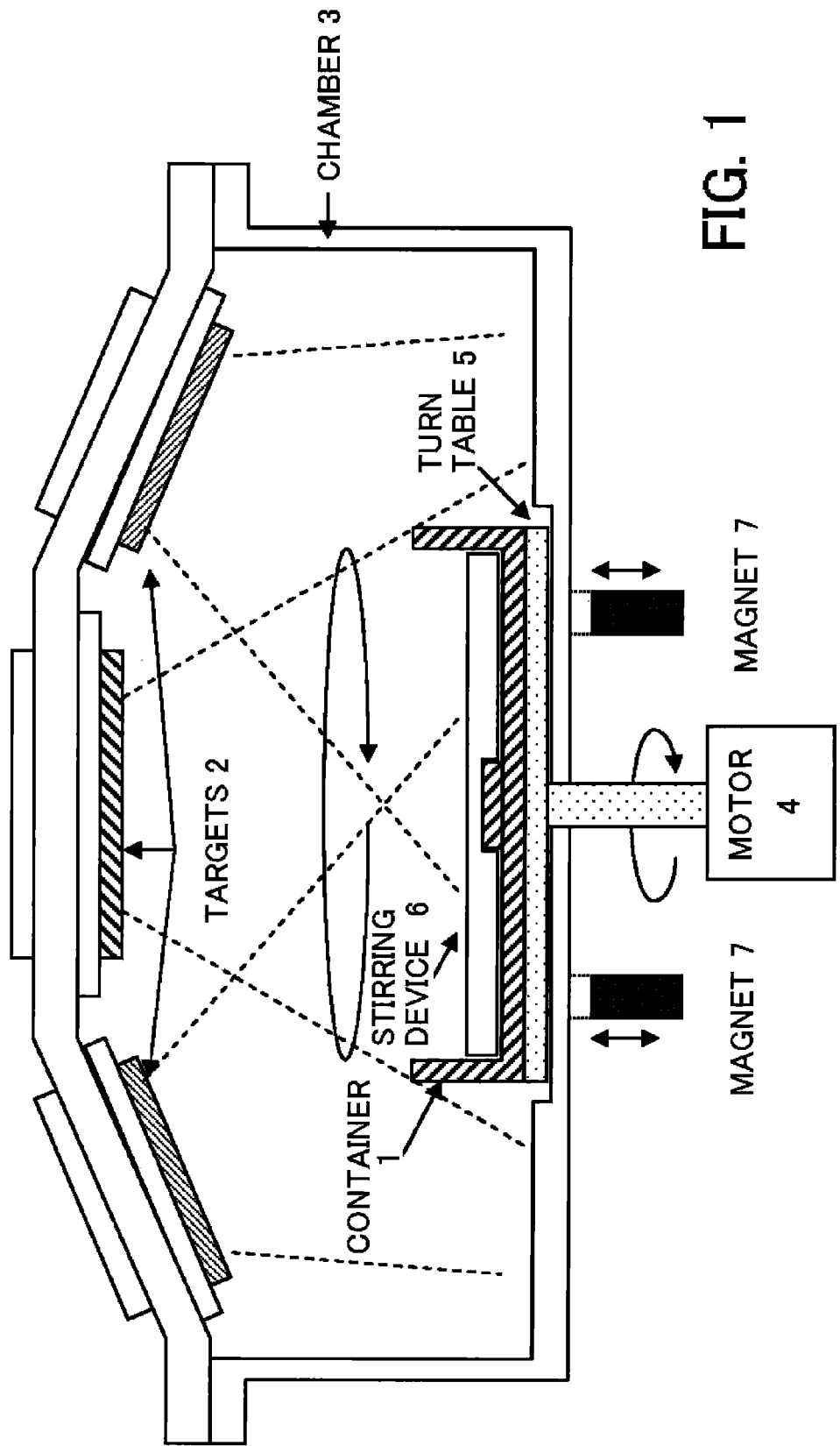
FIG. 1 is a schematic view of particulate support apparatus according to the present invention.

Preferred embodiments of the present invention are explained below. According to one aspect of the present invention, a supporting method as described below is disclosed. The supporting method is for supporting alloy particles which comprise at least more than two elements. The supporting method of the alloy particles is carried out in a decompression apparatus, and a plurality of alloy particles are supported on granular supports. The diameters of the alloy particles are less than the diameters of the granular supports. The decompression apparatus has an evaporator, a container, a device for rotating the container and a stirring device. The evaporator is able to evaporate a plurality of elements for forming alloy particles (catalyst particles). The container holds a plurality of granular supports. The container holds a plurality of granular supports so that the relative position among the granular supports can be changed. The stirring device is disposed in the container. According to a supporting method of the present invention, the container and the stirring device rotate individually. In one period, the container and the stirring device holds a plurality of granular supports so that the relative position among the granular supports is not changed, in another period, the container and the stirring device change the relative position among the granular supports. The particles of an alloy (catalyst) are supported by a plurality of granular supports according to the supporting method described above.

In a conventional evaporation method, a plurality of substrates such as glass substrates are provided, and the plurality of substrates pass through a deposition area sequentially, and a film of the evaporated element is deposited on the substrates. In this evaporation method, a deposition period of evaporated elements and a non-deposition period of evaporated elements exist. In the conventional evaporation method, evaporated elements can be deposited on substrates at any moving speed of substrates. In a vapor deposition using glass substrates (plate substrate), a seed generation for forming a film of evaporated elements can be achieved at various moving speeds of substrate, and a film of the evaporated elements can be formed even if the moving speed of substrates is fast. It is easy to form the seed because the evaporated atoms can migrate at large area as far as evaporated atoms reach a substrate, and even if not so many evaporated atoms reach a substrate, atoms that reach to a substrate are gathered and form a film of evaporated elements.

However, the surface of granular supports whose average diameter is equals to or less than 1 µm have many defects. Therefore, evaporated atoms migrate at narrow area of the granular supports. Therefore, seeds of the catalyst particles are hardly formed, and it is difficult to grow a seed as a catalyst particle because evaporated atoms has to be reach near the seed of the catalyst particle. That is, if evaporated atoms can not reach near the seeds, particles which have diameters 2 to 10 nm are hardly formed. In order to form catalyst particles which have diameters between 2 to 10 nm, granular supports should not be stirred until particles which have diameters between 2 to 10 nm are formed. After particles are formed on granular supports, granular supports that do not support catalyst particles have to be exposed to a deposition area.

According to the present invention, a certain surface of granular supports has to be exposed to a deposition area, and receive a certain amounts of catalyst atoms of alloy. If the surface, which faces a source of alloy, of the granular supports is often changed during deposition, alloy particles are prevented from growing. Therefore, granular supports should be moved in a depression apparatus. According to the present invention, stirring period in which the relative position among granular supports is changed and non-stirring period in which the relative position among granular supports is not changed are provided.

According to a study by inventors of the present invention, catalyst particles which have diameters between 2 to 10 nm are formed base on a product of a non-stirring period and a evaporated amount of catalyst atoms. TABLE 1 and TABLES 2A to 2C show a relationship between X and T1.

TABLE 1

| EVAPORATED AMOUNT ($\times 10^{13}$ atm/cm$^2$ · sec) | T1 (sec) | T2 (sec) | PARTICLE DIAMETER (nm) | PRODUCT AMOUNT (g/unit time) |
|---|---|---|---|---|
| 1 | 100 | 2 | 0 | 0 |
| 1 | 500 | 2 | 0 | 0 |

TABLE 1-continued

| EVAPORATED AMOUNT (×10$^{13}$ atm/cm$^2$·sec) | T1 (sec) | T2 (sec) | PARTICLE DIAMETER (nm) | PRODUCT AMOUNT (g/unit time) |
|---|---|---|---|---|
| 1 | 1000 | 2 | 2 | 0.1 |
| 1 | 5000 | 2 | 2 | 2 |
| 5 | 100 | 2 | 0 | 0 |
| 5 | 500 | 2 | 2 | 2 |
| 5 | 1000 | 2 | 2 | 20 |
| 5 | 5000 | 2 | 2 | 20 |

TABLE 2A

| EVAPORATED AMOUNT (10$^{14}$ atom/cm$^2$·sec) | T1 (sec) | T2 (sec) | PARTICLE DIAMETER (nm) | PRODUCT AMOUNT (g/unite time) |
|---|---|---|---|---|
| 1 | 0 | continuous | 0 | 0 |
| 1 | 10 | 2 | 0 | 0 |
| 1 | 50 | 2 | 0 | 0 |
| 1 | 100 | 2 | 2 | 98 |
| 1 | 500 | 2 | 3 | 99 |
| 1 | 1000 | 2 | 4 | 100 |
| 5 | 0 | continuous | 0 | 0 |
| 5 | 10 | 2 | 0 | 0 |
| 5 | 50 | 2 | 3 | 480 |
| 5 | 100 | 2 | 4 | 490 |
| 5 | 500 | 2 | 5 | 498 |
| 5 | 1000 | 2 | 6 | 500 |
| 10 | 0 | continuous | 0 | 0 |
| 10 | 10 | 2 | 2 | 100 |
| 10 | 50 | 2 | 3 | 960 |
| 10 | 100 | 2 | 4 | 980 |
| 10 | 500 | 2 | 6 | 996 |
| 10 | 1000 | 2 | 8 | 1000 |
| 20 | 0 | continuous | 0 | 0 |
| 20 | 10 | 2 | 2 | 200 |
| 20 | 20 | 2 | 3 | 1200 |
| 20 | 50 | 2 | 4 | 1920 |
| 20 | 100 | 2 | 6 | 1960 |
| 20 | 500 | 2 | 7 | 1992 |
| 20 | 1000 | 2 | 8 | 2000 |
| 50 | 0 | continuous | 0 | 0 |
| 50 | 10 | 2 | 2 | 3000 |
| 50 | 50 | 2 | 4 | 4800 |
| 50 | 100 | 2 | 6 | 4900 |
| 50 | 500 | 2 | 7 | 4960 |
| 50 | 1000 | 2 | 8 | 4980 |
| 50 | 2000 | 2 | 9 | 5000 |
| 100 | 0 | continuous | 0 | 0 |
| 100 | 10 | 2 | 4 | 5000 |
| 100 | 50 | 2 | 8 | 9500 |
| 100 | 100 | 2 | 9 | 9800 |
| 100 | 500 | 2 | 10 | 9000 |
| 100 | 1000 | 2 | membranous | 0 |
| 200 | 0 | continuous | 0 | 0 |
| 200 | 10 | 2 | 4 | 10000 |
| 200 | 50 | 2 | 8 | 19000 |
| 200 | 100 | 2 | 9 | 19500 |
| 200 | 200 | 2 | 10 | 18000 |
| 200 | 500 | 2 | membranous | 0 |
| 500 | 0 | continuous | 0 | 0 |
| 500 | 10 | 2 | 6 | 30000 |
| 500 | 50 | 2 | 9 | 46000 |
| 500 | 100 | 2 | 10 | 30000 |
| 500 | 200 | 2 | membranous | 0 |
| 1000 | 0 | continuous | 0 | 0 |
| 1000 | 10 | 2 | 10 | 50000 |
| 1000 | 50 | 2 | membranous | 0 |
| 1000 | 100 | 2 | membranous | 0 |
| 2000 | 0 | continuous | 0 | 0 |
| 2000 | 5 | 2 | membranous | 0 |
| 2000 | 20 | 2 | membranous | 0 |

TABLE 2B

| EVAPORATED AMOUNT (10$^{14}$ atom/cm$^2$·sec) | T1 (sec) | T2 (sec) | PARTICLE DIAMETER (nm) | PRODUCT AMOUNT (g/unit time) |
|---|---|---|---|---|
| 1 | 0 | continuous | 0 | 0 |
| 1 | 10 | 4 | 0 | 0 |
| 1 | 50 | 4 | 0 | 0 |
| 1 | 100 | 4 | 2 | 97 |
| 1 | 500 | 4 | 3 | 98 |
| 1 | 1000 | 4 | 4 | 99 |
| 5 | 0 | continuous | 0 | 0 |
| 5 | 10 | 4 | 0 | 0 |
| 5 | 50 | 4 | 3 | 460 |
| 5 | 100 | 4 | 4 | 480 |
| 5 | 500 | 4 | 5 | 496 |
| 5 | 1000 | 4 | 6 | 498 |
| 10 | 0 | continuous | 0 | 0 |
| 10 | 10 | 4 | 2 | 60 |
| 10 | 50 | 4 | 3 | 920 |
| 10 | 100 | 4 | 4 | 960 |
| 10 | 500 | 4 | 6 | 992 |
| 10 | 1000 | 4 | 8 | 996 |
| 20 | 0 | continuous | 0 | 0 |
| 20 | 10 | 4 | 2 | 160 |
| 20 | 20 | 4 | 3 | 1000 |
| 20 | 50 | 4 | 4 | 1840 |
| 20 | 100 | 4 | 6 | 1920 |
| 20 | 500 | 4 | 7 | 1984 |
| 20 | 1000 | 4 | 8 | 1992 |
| 50 | 0 | continuous | 0 | 0 |
| 50 | 10 | 4 | 2 | 2000 |
| 50 | 50 | 4 | 4 | 4600 |
| 50 | 100 | 4 | 6 | 4800 |
| 50 | 500 | 4 | 7 | 4920 |
| 50 | 1000 | 4 | 8 | 4960 |
| 50 | 2000 | 4 | 9 | 4980 |
| 100 | 0 | continuous | 0 | 0 |
| 100 | 10 | 4 | 4 | 3000 |
| 100 | 50 | 4 | 8 | 9300 |
| 100 | 100 | 4 | 9 | 9600 |
| 100 | 500 | 4 | 10 | 9500 |
| 100 | 1000 | 4 | membranous | 0 |
| 200 | 0 | continuous | 0 | 0 |
| 200 | 10 | 4 | 4 | 6000 |
| 200 | 50 | 4 | 8 | 18000 |
| 200 | 100 | 4 | 9 | 19200 |
| 200 | 200 | 4 | 10 | 19000 |
| 200 | 500 | 4 | membranous | 0 |
| 500 | 0 | continuous | 0 | 0 |
| 500 | 10 | 4 | 6 | 20000 |
| 500 | 50 | 4 | 9 | 43000 |
| 500 | 100 | 4 | 10 | 40000 |
| 500 | 200 | 4 | membranous | 0 |
| 1000 | 0 | continuous | 0 | 0 |
| 1000 | 10 | 4 | 10 | 40000 |
| 1000 | 50 | 4 | membranous | 0 |
| 1000 | 100 | 4 | membranous | 0 |
| 2000 | 0 | continuous | 0 | 0 |
| 2000 | 5 | 4 | membranous | 0 |
| 2000 | 20 | 4 | membranous | 0 |

TABLE 2C

| EVAPORATED AMOUNT (10$^{14}$ atom/cm$^2$·sec) | T1 (sec) | T2 (sec) | PARTICLE DIAMETER (nm) | PRODUCT AMOUNT (g/unite time) |
|---|---|---|---|---|
| 1 | 0 | continuous | 0 | 0 |
| 1 | 10 | 6 | 0 | 0 |
| 1 | 50 | 6 | 0 | 0 |
| 1 | 100 | 6 | 2 | 96 |
| 1 | 500 | 6 | 3 | 97 |
| 1 | 1000 | 6 | 4 | 98 |
| 5 | 0 | continuous | 0 | 0 |
| 5 | 10 | 6 | 0 | 0 |
| 5 | 50 | 6 | 3 | 440 |

TABLE 2C-continued

| EVAPORATED AMOUNT ($10^{14}$ atom/cm² · sec) | T1 (sec) | T2 (sec) | PARTICLE DIAMETER (nm) | PRODUCT AMOUNT (g/unite time) |
|---|---|---|---|---|
| 5 | 100 | 6 | 4 | 470 |
| 5 | 500 | 6 | 5 | 494 |
| 5 | 1000 | 6 | 6 | 496 |
| 10 | 0 | continuous | 0 | 0 |
| 10 | 10 | 6 | 2 | 20 |
| 10 | 50 | 6 | 3 | 880 |
| 10 | 100 | 6 | 4 | 940 |
| 10 | 500 | 6 | 6 | 988 |
| 10 | 1000 | 6 | 8 | 992 |
| 20 | 0 | continuous | 0 | 0 |
| 20 | 10 | 6 | 2 | 120 |
| 20 | 20 | 6 | 3 | 800 |
| 20 | 50 | 6 | 4 | 1760 |
| 20 | 100 | 6 | 6 | 1880 |
| 20 | 500 | 6 | 7 | 1976 |
| 20 | 1000 | 6 | 8 | 1984 |
| 50 | 0 | continuous | 0 | 0 |
| 50 | 10 | 6 | 2 | 1000 |
| 50 | 50 | 6 | 4 | 4400 |
| 50 | 100 | 6 | 6 | 4700 |
| 50 | 500 | 6 | 7 | 4880 |
| 50 | 1000 | 6 | 8 | 4940 |
| 50 | 2000 | 6 | 9 | 4960 |
| 100 | 0 | continuous | 0 | 0 |
| 100 | 10 | 6 | 4 | 2000 |
| 100 | 50 | 6 | 8 | 9100 |
| 100 | 100 | 6 | 9 | 9400 |
| 100 | 500 | 6 | 10 | 9400 |
| 100 | 1000 | 6 | membranous | 0 |
| 200 | 0 | continuous | 0 | 0 |
| 200 | 10 | 6 | 4 | 3000 |
| 200 | 50 | 6 | 8 | 17000 |
| 200 | 100 | 6 | 9 | 19000 |
| 200 | 200 | 6 | 10 | 19500 |
| 200 | 500 | 6 | membranous | 0 |
| 500 | 0 | continuous | 0 | 0 |
| 500 | 10 | 6 | 6 | 10000 |
| 500 | 50 | 6 | 9 | 40000 |
| 500 | 100 | 6 | 10 | 38000 |
| 500 | 200 | 6 | membranous | 0 |
| 1000 | 0 | continuous | 0 | 0 |
| 1000 | 10 | 6 | 10 | 30000 |
| 1000 | 50 | 6 | membranous | 0 |
| 1000 | 100 | 6 | membranous | 0 |
| 2000 | 0 | continuous | 0 | 0 |
| 2000 | 5 | 6 | membranous | 0 |
| 2000 | 20 | 6 | membranous | 0 |

X (atom/sec×cm²) is the amount of elements evaporated and reach to granular supports. T1 (sec) is a period of time of the relative potion among granular supports is not changed (not stirred). If X times T1 is equal to or less than $1\times10^{16}$, the particulate is not formed. If X times T1 is equal to or more than $1\times10^{19}$, an alloy film covers granular supports. AS shown in table 1, if X is equal to or less $1\times10^{14}$, the particulates are hardly formed even if T1 is extended. AS shown in table 2, if X is equal to or more than $1\times10^{18}$, a catalyst film may be formed even if T1 is shortened. Therefore, X has to be determined between $1\times10^{14}$ and $1\times10^{18}$. Further, it is preferable that X is determined between $5\times10^{14}$ to $5\times10^{17}$ in consideration with productivity and yield.

On the other hand, if granular supports that are disposed at a surface of the stirring container are exchanged during a stirring period, it is enough to achieve an effect of a stirring. Therefore, it is preferable to set a stirring time as short as possible. Because evaporated materials may be wasted while a vapor deposition is performed by stirring because particles may not be formed as described above. Therefore, T1 have to be longer than T2, and it is preferable that T1/T2 is bigger than 10. If T2 is set as very short period, granular supports that are disposed at a surface side of the container are not exchanged enough during a stirring period, a film of a catalyst alloy may be formed on carbon supports. That decreases a process yield, especially, if a vapor deposition rate per unit time is high, T2 have to be extended. When a vapor deposition rate per unit time is high, granular supports have to be stirred enough and the possibilities for forming a film of a catalyst alloy have to be decreased. If the T2 is extended and is long period, it is preferable to halt an evaporation to decrease wastes of materials. The sputtering method is preferable because halt and restarting of evaporation can be changed quickly.

According to a stirring apparatus used in the supporting method and supporting apparatus of the present invention, the stirring apparatus can change a relative position among granular supports. Further, a first period in which a relative position of the granular supports is not changed at an inner portion of the container and a second period in which a relative position among granular supports is not changed at an outer portion of the container are different. The outer portion of the container can holds granular supports so that the period in which the relative position of granular supports is not changed is longer than the period in which the inner portion of the container can holds granular supports so that the relative position is not changed. As described above, if granular supports move before the particles of the catalyst is formed, the evaporated atoms may be wasted, and granular supports have not to be moved before the particles of the catalyst is formed. In a conventional vapor deposition, a substrate is disposed where the evaporated atoms reach to the substrate constantly. However, if rare metals are used as evaporated materials, a substrate (in the present invention, carbon supports) has to be disposed even if the evaporated atoms do not reach to the substrate constantly because cost for producing carbon supports is increased.

However, surfaces to be deposited by catalyst materials do not have to be moved until particles of the catalyst particles are formed. Therefore, stirring period and non-stirring period have to be determined based on an amount reaching to a surface of supports per unit time. The inner portion of container receives much atoms of catalyst than that of the outer portion of container, and the non-stirring period at the outer portion of the container is longer than that of the inner portion of the container. It is preferable that the X×T1 is higher than $1\times10^{16}$ and lower than $1\times10^{19}$ at any point of the container.

The granular supports which can be used in the present invention are a granular supports which has average diameters 50 to 200 nm. The materials of the granular supports are, for example, carbon particle, titan-oxide and tungsten-oxide. As for an electrode of the DMFC, it is preferable to use a carbon granular supports because of a low electrical resistivity. A specific surface area of the carbon substrates is preferable between 50 to 600 m²/g. If the specific surface area is not included in the above described range, it is difficult to support enough catalyst particles or carbon granular supports are easy to disperse. Thereby, it is difficult to control a granular supports condition.

Metal atoms which is hold as catalyst onto a granular supports is able to be chosen from at least one of a group of W, Nb, Pd, Rh, Os, Ir, Re, Au, Ag, Fe, Ni, Ti, Al, Cu, Co, Mo, Mn, Nd, Zn, Ga, Ge, Cd, In, Sn, V, Cr, Zr, Mg, Ca, Rb, Y, Sb, Pb, Bi.

A composition of a catalyst is not determined strictly, however a catalyst includes 30 to 60 at % of Pt, 20 to 50 at % of Ru and above described materials are included except for Pt and Ru. In case that the composition of a catalyst is not included in above described composition, a catalyst activity is not enough and internal loss is increased because of internal resistance. It is preferable that the composition of the catalyst is included in the above description.

It is preferable that the metal amount supported by a granular supports is 40-80 wt % toward the amount of granular supports, further it is preferable that the metal amount supported by a granular supports is more than 50 wt %. If the metal amount supported by granular supports is less than above described amount, electric generation ability may be not enough as a fuel cell, and if the metal amount supported by granular supports is more than above described amount, agglomeration may occur between the metal particles. It is not preferable in view of a characteristic.

Embodiment 2

Holding Apparatus

The embodiment 2 is described below with referring to the drawings. FIG. 1 is a schematic diagram showing a particle supporting apparatus of the present invention. As shown in FIG. 1, a particle supporting apparatus of the present invention has a chamber 3, targets 2, a container 1, a stirring device 6, a rotating device 4 and a rotation prohibiting device 7. The chamber 3 can hold an inner space of the chamber 3 in a sealed situation. The targets 2 are disposed at upper side of the chamber 3 and operate as evaporation sources of elements for forming a catalyst alloy. The container 1 is made of a non-magnetic material, and disposed at lower side of the chamber 3. The container 1 holds granular supports and can rotate based on rotation of rotating device 4. The stirring device 6 is disposed in the container 1. The rotating device 4 for rotating the container 1 is a motor and so on. The rotation prohibiting device 7 is disposed under the chamber 3.

The container 1 is fixed to the rotation axis protruded from the rotating device 4 and able to rotate based on a rotation of the rotating device 4. The container 1 can be disposed on a turntable which is disposed in the chamber 3. In this case, the turntable rotates based on a rotation of the rotating device 4 and the container 1 rotates according to the rotation of the turntable. It is preferable that the container 1 has a cylindrical shape so that the stirring rate of granular supports becomes high efficiency.

It is preferable that a rotating speed of the container 1 is equal to or faster than 10 rpm or equal to or less than 100 rpm.

The stirring device 6 is loosely fixed to the axis protruded from the rotating device 4. The stirring device can move freely to the movement of the rotating device 4. The stirring device 6 is made of a magnetic material, and a magnet can halt a movement of the stirring device 6. A magnet can hold a rotation of the stirring device 6 by magnetic force. A plate type stirring device of a magnetic material, for example an iron plate, can be used as the stirring device. The stirring device can have a plurality of fins. Fins are connected to a hole which is corresponding to the axis of the rotating device. A number of the fins is not limited to two, more than two fins may be formed as a stirring device.

The rotation prohibiting device is disposed under the bottom of the chamber 3. The rotation prohibiting device 7 can move upward and downward to the bottom of the chamber. If the rotation prohibiting device is held near the bottom of the chamber 3, the rotation of the stirring device is halted, and the relative position between the chamber and the stirring device is not changed because of a magnetic force. In this situation, the container 1 keeps rotating and the granular supports held in the container are stirred. If the rotation prohibiting device is away from the bottom of the chamber 3, the stirring device rotates in synchronization with the container in rotation, and the granular supports held in the container is not stirred. In the present example a set of magnets are used as a rotation prohibiting device.

A non-magnetized material is used as a stirring device and a magnet is used as a rotation prohibiting device in the above description. However, a magnet can be used as a stirring device and a non-magnetized material can be used as a rotation prohibiting device.

A vacuuming device, a heating device, a high-frequency power source device, a magnet and a gas supporting device and so on are not shown in Figs. However, these devices are included in the supporting apparatus. For example, a vacuuming device decreases a pressure in the chamber, a heating device evaporates the elements held in an evaporation source for forming a catalyst alloy, a high-frequency power source device and a magnet is used for sputtering and a gas supporting device is used to support an atmosphere in the chamber. Further, the supporting apparatus of the present invention includes a control device. The control device controls a pressure and a temperature in the chamber, an operation of an evaporation device or sputtering device, a rotation speed of the container and a position of a magnet. An amount of evaporated element of an alloy, a stirring period and a non-stirring period can be controlled by using the control device.

The depositing method using the above described supporting apparatus is described below. According to this method, a stirring period in which the relative positions among granular supports are changed and a non-stirring period in which the relative positions among the granular supports are not changed are provided.

Figure 5:
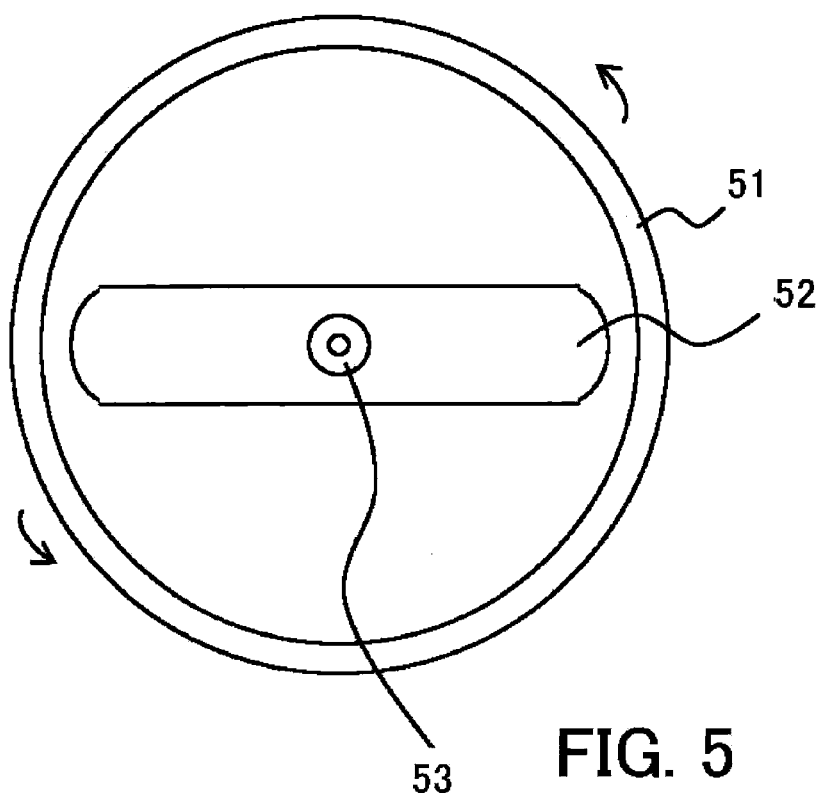
FIG. 5 is over head view of particulate support apparatus according to the present invention.

FIG. 5 shows a schematic top view of the supporting apparatus of the present invention. Particularly, FIG. 5 shows a relationship between a container 51 and a stirring device 52. The stirring device 52 is fixed to the center of the container 51, and the stirring device can rotate independently from the container. The container rotates at 1 rpm to 100 rpm, and the stirring device 52 can be halted as shown in FIG. 1 by using the rotation prohibiting device. By halting the stirring device, the relative position among granular supports can be changed. However, only granular supports located near the stirring device alternate their relative position. Therefore, stirred and unstirred area constantly exists in the container during the working of rotation prohibiting device. The catalyst particles easily grow on granular supports located at the unstirred area. The rotating speed of the container is changed based on an amount of the evaporated material. For example, the rotating speed can be 20 rpm if a lot of evaporated atoms reach to granular supports. In this case, it is desirable that the diameter of the container is larger than 10 cm. When the rotating speed of the container is slow, granular supports which are disposed far from the center of rotation (53) are stirred and the relative position among the granular support is changed. However, granular supports which are disposed near the center of rotation are hardly stirred and the relative position among granular supports is changed only a little bit. Further, an area where the relative positions among granular supports are changed also base on the shape of the stirring device. A planer or bar-shaped stirring device spreads the area where the relative position among granular supports is not changed. In order to prevent evaporated materials from depositing to the stirring device, it is preferable that the stirring device is covered by granular supports during deposition. In case that the evaporated material is deposited to the stirring device, a metal foil may be formed on the stirring device, and the metal foil may be removed from the stirring device. If an electrode includes a metal foil, the included metal foil does not operate as a catalyst even if the metal foil includes Pt. Further, elements included in the metal foil may be eluted and the characteristics of an electrode is degraded based on a used time of the electrode. The area where the relative position among granular supports is not changed is based on the diameter of the container. Therefore, if the diameter of the container is short, the area where the relative position among granular supports is not changed becomes small, and the rotating speed of the container should be slow. In the area near the center of the container, even if a period for the relative position among granular supports to be changed is long, when the area near the center of the container for the relative position among granular supports to be changed is equal to or less than 20% of the whole area of the container, there is no effect to the product amount of catalyst and the size of the container can be ignored.

Table 3 shows a product amount of DMFC catalyst.

In Table 3, a catalyst is a PtRuWMo catalyst which has an average diameter 4 to 10 nm, and the t PtRuWMo catalyst is supported by granular supports. In the experiment shown in Table 3, the amount of the evaporated atoms is $1\times10^{18}$ atoms/sec·cm$^2$, and a area of a surface of the container disclosed is 320 cm$^2$.

TABLE 3

| ROTATION SPEED (rpm) | PRODUCT AMOUNT (g) |
|---|---|
| 1 | 50 |
| 5 | 50 |
| 10 | 50 |
| 20 | 45 |
| 50 | 30 |
| 100 | 20 |

According to Table 3, DMFC catalyst of PtRuWMo catalyst which has an average diameter 4 nm can be produced when the rotating speed is slower. In case that the rotating speed is slower than that shown in Table 3, the average diameter of the catalyst may become wider than 10 nm, therefore the slower rotating speed than the speed shown in Table 3 is not preferable. Further, in case that the rotating speed is faster than that shown in Table 3, the average diameter of the catalyst may become shorter than 4 nm, therefore the rotating speed faster than the speed shown in Table 3 is not preferable.

Third Embodiment

Second Supporting Apparatus

In the second embodiment, only one stirring device is disclosed, however a plurality of stirring devices can be provided in a container. A supporting amount of a granular supports can be equalized by using a plurality of stirring devices despite of a position in the container.

Figure 2:
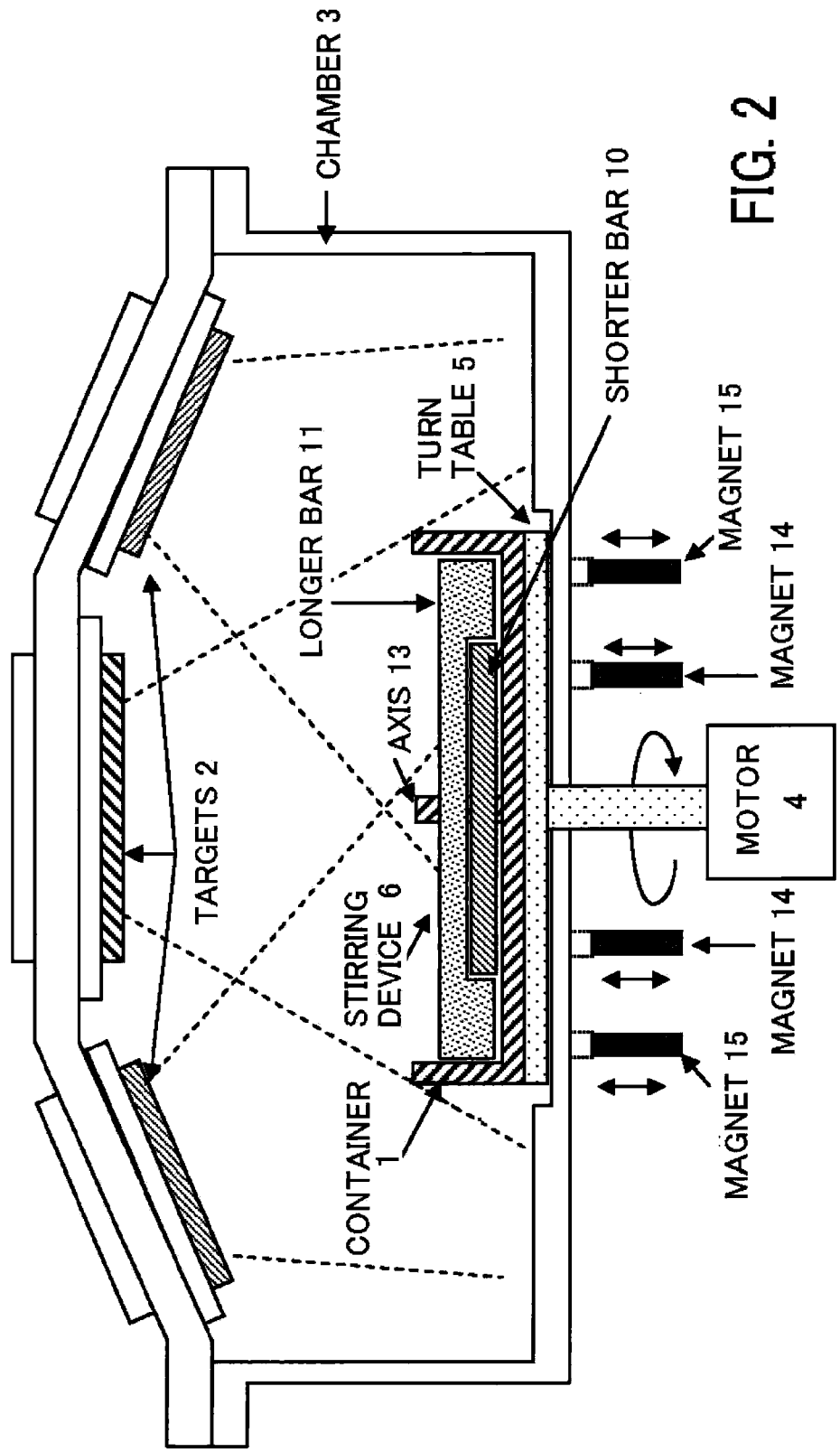
FIG. 2 is a schematic view of second particulate support apparatus according to the present invention.

FIG. 2 is an example showing a supporting apparatus of this embodiment. In FIG. 2, same reference numerals that are used in FIG. 1 are used, and the detailed description of the components are omitted.

The stirring device 6 of the present embodiment comprises two parts of bars. Both parts of the stirring device are loosely fixed at a center of the container 1 as described in the embodiment 1. One part of the stirring device is a longer bar 10, and another part of the stirring device is a shorter bar 11. Further, two sets of magnets are disposed under the chamber. Each set of magnets can move upward and downward to the bottom of the chamber. If a first set of magnets 14 is disposed close to the bottom of the chamber, the shorter bar 10 is halted, and granular supports (carbon supports) disposed at inner side are stirred. If a second set of magnets 15 is disposed close to the bottom of the chamber, the longer bar 11 is halted, and granular supports disposed at outer side are stirred. A first stirring period to halt the shorter bar and the second stirring period to halt the longer bar is different, Therefore, a non-stirring period of granular supports at inner side and a non-stirring period of granular supports at outer side can be changed.

Example 1

Pt, Ru, W are used in Example 1 and sputtering is performed. In Example 1, the supporting apparatus shown in FIG. 1 is used. The container 1 is disposed on the turn table 5, and holds granular supports (carbon supports) that have an average diameter of 200 nm, and surface area of 50 cm$^2$/g. The sputtering time is 10 hours. The sputtering condition is described below. The turn table 5 is rotated at rotating speed between 10 rpm to 100 rpm by the motor 4 which is disposed at outside of the chamber. The stirring device 6 is disposed in the container 1, and made of magnetic material. The stirring device can rotates, the center of the rotation of the stirring device is a center of the container 1. As described above, while the stirring device rotates with the container 1, the granular supports are not stirred. When the magnets 7 are disposed close to the bottom of the chamber, the stirring device is halted, and granular supports are stirred because the container 1 keeps rotation.

| [Sputtering Condition] RF power | |
|---|---|
| Pt, Ru; | 1 kW |
| W; | 500 W |
| Flow rate of Ar; | 50 SCCM |
| Pressure; | 1:10$^{-2}$ Pa |
| non-stirring time T1; | 100 Sec. |
| stirring time T2; | 5 Sec. |
| Amount of vaporized atom; | $1 \times 10^{15}$ atms/cm$^2$ · Sec |

100 g which supports PtRuW catalyst is produced by the above described method. A supporting rate of carbon granular supports (a ratio between a weight of carbon and a weight of catalyst) of the PtRuW catalyst is 50%. Then, a cathode electrode and an anode electrode are produced using granular supports produced by the above described method. A MEA (Membrane and Electrode Assembly) are formed using the anode electrode, the cathode electrode and Nafion117 (Dupon). Nafion is disposed between the anode electrode and the cathode electrode. The anode electrode and the cathode electrode and the Nafion is bonded using a thermalcompression. The thermalcompression is performed under a situation at temperature of 125° C., bonding time is 10 min. And the pressure of bonding is 30 kg/cm$^2$. The Nafion is used as a proton exchange membrane. A cell of the DMFC is produced using above described MEA and a flow path plate. A solution of 1M methanol is supplied to the anode of the fuel cell at a flow rate of 0.6 ml/min, air is supplied to the cathode of the fuel cell. In this condition, the fuel cell is discharged. The current density is kept at 150 mA/cm$^2$ at the temperature of 65° C. in discharging. An output voltage is measured after the beginning of discharge, the fuel cell outputs 0.6 V. The voltage measured by this fuel cell is 20% higher than a fuel cell which include a noble metal at the same rate. If Ru is formed under vacuumed condition as described in the example, Ru is not oxidized. Therefore, elution by a formic acid is decreased, and less characteristic degradation is observed.

Example 2

The supporting apparatus shown in FIG. 2 is used in this example. The longer bar and the shorter bar are fixed at the same axis 13. Two sets of magnets are disposed under the chamber, the two sets of magnets can move toward the bottom of chamber. The moving period of each set of magnets is different with each other, and the non-stirring period at inner portion and outer portion of the container is different.

Figure 3:
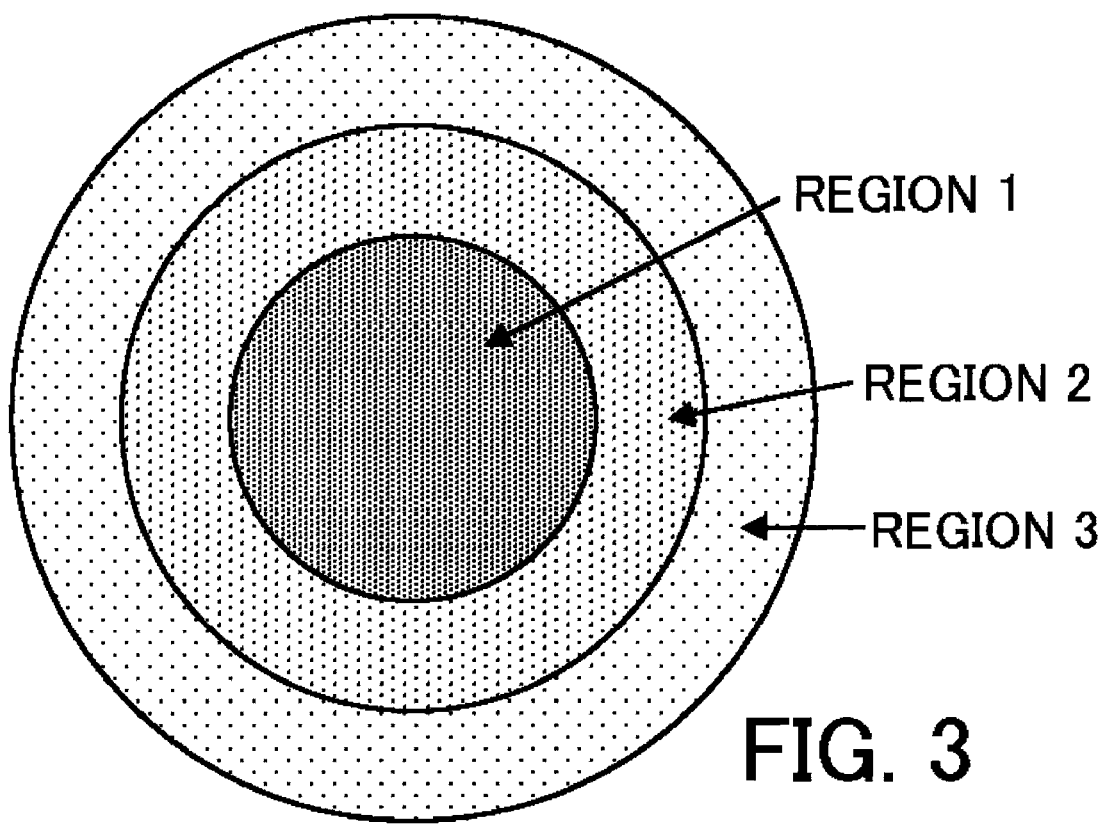
FIG. 3 is schematic view of distribution for amount of deposited materials by using second particulate support apparatus according to the present invention.

FIG. 3 shows a distribution of the vaporized materials which are deposited on granular supports under the condition as described in Example 1. When the distance between the center target and the container is set 10 cm, almost the same composition of metal is deposited within a circle of 20 cm in diameter, and the most amount of evaporated materials is observed at region 1. The amount of the evaporated material is $1\times10^{15}$ atoms/cm$^2$·sec at region 1. The amount of the evaporated material at region 2 is less than that of region 1, and the amount of the evaporated material at region 3 is less than that of region 2. The amount of the evaporated material at region 3 is $1\times10^{14}$ atoms/cm$^2$·sec.

When the container having 20 cm of diameter is disposed at the evaporation region as described, the outer region of the container corresponds to region 3, therefore, the rotation time of the longer bar 11 is longer than the shorter bar rotation time. That is, non-stirring period at outside region is longer than that of the inner region. Non-stirring time at the outside region is set 2 to 10 times longer than that of the inner region. 140 g of granular supports supporting a catalyst which supporting rate is 50% is formed by using above described method.

Then, a cathode electrode and an anode electrode are produced using granular supports produced by the above described method. A MEA (Membrane and Electrode Assembly) are formed using the anode electrode, the cathode electrode and Nafion117 (Dupon). Nafion is disposed between the anode electrode and the cathode electrode. The anode electrode and the cathode electrode and the Nafion is bonded using a thermalcompression. The thermalcompression is performed under a situation at temperature of 125° C., bonding time is 10 min. And the pressure of bonding is 30 kg/cm$^2$. The Nafion is used as a proton exchange membrane. A cell of the DMFC is produced using above described MEA and a flow path plate. A solution of 1M methanol is supplied to the anode of the fuel cell at a flow rate of 0.6 ml/min, air is supplied to the cathode of the fuel cell. In this condition, the fuel cell is discharged. The current density is kept at 150 mA/cm$^2$ at the temperature of 65° C. in discharging. An output voltage is measured after the beginning of discharge, the fuel cell outputs 0.6 V. The voltage measured by this fuel cell is 20% higher than a fuel cell which include a noble metal at the same rate. According to this method, rare metals such as Pt can be used with a little waste, even if the region where the amount of evaporated materials not so much. The catalyst can be formed with high efficiency.

Figure 4:
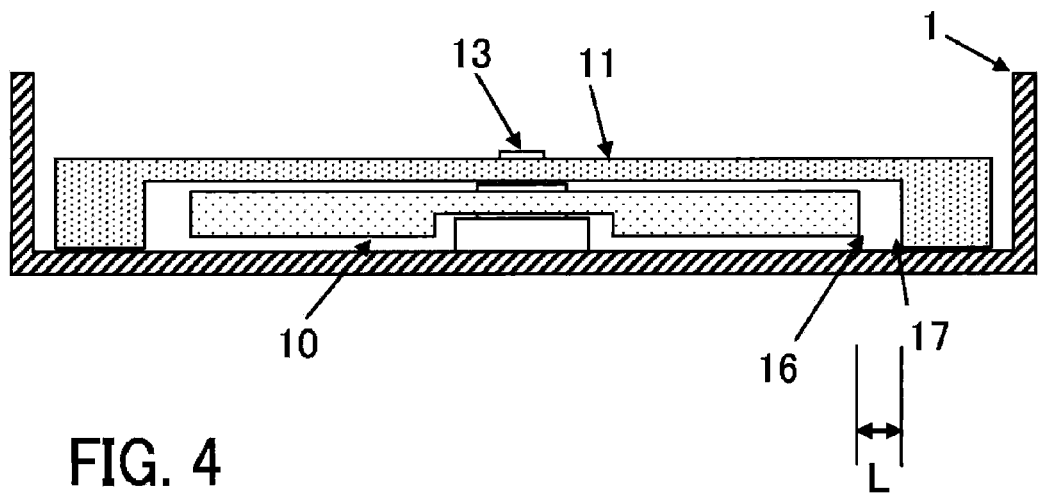
FIG. 4 is schematic view of relation container and stirred jig for second particulate support apparatus according to the present invention.

In FIG. 4, it is preferable that the outermost part 16 of the shorter bar and the innermost part of the longer bar are within region 2. In the region 2, an amount of evaporated materials gradually changes. In this embodiment, the amount of evaporated material in region 2 is more than 10% of the maximum evaporated amount and less than 80% of the maximum evaporated amount. However, if the region 2 is very narrow, the outermost part 16 of the shorter bar and the innermost part of the longer bar may be positioned except for region 2. A certain distance L can be arranged between the outermost part 16 of the shorter bar and the innermost part of the longer bar. It is preferable that the distance L is equal to or longer than ⅒ of the radius of the container, and equals to or less than ⅕ of the radius of the container. If the distance L is too long, stirring of the granular supports may not be enough, and the catalyst film may be formed. Thereby, yield of the production may be decreased. On the other hand, If the distance L is too short, granular supports that have not to be stirred may be stirred, and the production amount may be decreased.

What is claimed is:

1. A supporting method for supporting a metal particle including at least two elements on a surface of a plurality of granular supports in a particle supporting apparatus, the granular supports being a particle-like support substance on which the metal particle is deposited, the supporting method supporting the metal particle whose particle diameter is smaller than an average grain size of the granular supports, the supporting method comprising:

evaporating the elements by an evaporation source;

holding the plurality of granular supports in a container; and rotating at least one of a stirring device disposed in the container and the container, the rotating including a stirring period in which relative positions among the plurality of granular supports are changed and a non-stirring period in which the relative positions among the plurality of granular supports are not changed, wherein the particle supporting apparatus comprises the evaporation source for evaporating elements to form an alloy particle, the container for holding the plurality of granular supports within the particle supporting apparatus so that a relative position among the granular supports is able to be changed, and a rotating device for rotating at least one of the container and the stirring device, and wherein the particle consists of a Pt—Ru—V—Nb alloy.

2. The supporting method according to claim 1, wherein T1>T2, where T1 is a duration of time of the non-stirring period in which the relative position among the plurality of granular supports are not changed and T2 is a duration of time of the stirring period in which the relative position among the plurality of granular supports are changed, and further wherein $1\times10^{16}<X\times T1<1\times10^{19}$, where X (atoms/sec·cm$^2$) is a number of evaporated atoms that reach the granular supports per unit time and unit area.

3. The supporting method according to claim 1, wherein the stirring period and the non-stirring period are different based on a portion of the container.

4. The supporting method according to claim 3, wherein the non-stirring period at an outer side of the container is longer than that of an inner side of the container.

* * * * *